United States Patent
Johnson et al.

(10) Patent No.: US 7,218,973 B2
(45) Date of Patent: May 15, 2007

(54) ADAPTIVE CONTROL SYSTEM HAVING HEDGE UNIT AND RELATED APPARATUS AND METHODS

(75) Inventors: Eric Norman Johnson, Atlanta, GA (US); Anthony J. Calise, Atlanta, GA (US)

(73) Assignee: Georgia Tech Research Corporation, McDonough, GA (US)

( * ) Notice: Subject to any disclaimer, the term of this patent is extended or adjusted under 35 U.S.C. 154(b) by 429 days.

(21) Appl. No.: 10/602,458

(22) Filed: Jun. 23, 2003

(65) Prior Publication Data

US 2004/0088059 A1    May 6, 2004

Related U.S. Application Data

(63) Continuation of application No. 09/585,106, filed on May 31, 2000, now Pat. No. 6,618,631.

(60) Provisional application No. 60/199,615, filed on Apr. 25, 2000.

(51) Int. Cl.
G05B 13/02 (2006.01)
G06F 7/00 (2006.01)

(52) U.S. Cl. .......................................... 700/28; 701/58

(58) Field of Classification Search ................. 700/28, 700/29, 30, 31, 32, 47, 48, 173; 701/58, 701/59, 60, 63, 38
See application file for complete search history.

(56) References Cited

U.S. PATENT DOCUMENTS

| | | |
|---|---|---|
| 4,062,508 A | 12/1977 | Stephens et al. |
| 4,466,054 A | 8/1984 | Shigemasa et al. |
| 5,113,483 A | 5/1992 | Keeler et al. |
| 5,155,802 A | 10/1992 | Mueller et al. |
| 5,170,463 A | 12/1992 | Fujimoto et al. |
| 5,224,664 A | 7/1993 | Adams, Sr. et al. |

(Continued)

FOREIGN PATENT DOCUMENTS

JP    08044377 A    *    2/1996

(Continued)

OTHER PUBLICATIONS

Parent Corporation Treaty, Written Opinion Search Report, May 6, 2003, International Application No. PCT/US01/12797, filed Apr. 20, 2001 by Applicant Georgia Tech Research Corporation.

*Primary Examiner*—Thomas Pham
(74) *Attorney, Agent, or Firm*—Alston & Bird LLP

(57) ABSTRACT

The invention includes an adaptive control system used to control a plant. The adaptive control system includes a hedge unit that receives at least one control signal and a plant state signal. The hedge unit generates a hedge signal based on the control signal, the plant state signal, and a hedge model including a first model having one or more characteristics to which the adaptive control system is not to adapt, and a second model not having the characteristic(s) to which the adaptive control system is not to adapt. The hedge signal is used in the adaptive control system to remove the effect of the characteristic from a signal supplied to an adaptation law unit of the adaptive control system so that the adaptive control system does not adapt to the characteristic in controlling the plant.

24 Claims, 11 Drawing Sheets

U.S. PATENT DOCUMENTS

| | | |
|---|---|---|
| 5,241,509 A | 8/1993 | Jousselin et al. |
| 5,253,328 A | 10/1993 | Hartman |
| 5,268,834 A | 12/1993 | Sanner et al. |
| 5,274,746 A | 12/1993 | Mashiko |
| 5,282,261 A | 1/1994 | Skeirik |
| 5,303,385 A | 4/1994 | Hattori et al. |
| 5,311,421 A | 5/1994 | Nomura et al. |
| 5,313,559 A | 5/1994 | Ogata et al. |
| 5,367,612 A | 11/1994 | Bozich et al. |
| 5,396,415 A | 3/1995 | Konar et al. |
| 5,406,474 A | 4/1995 | Hansen |
| 5,469,265 A | 11/1995 | Measures et al. |
| 5,475,793 A | 12/1995 | Broomhead et al. |
| 5,541,843 A | 7/1996 | Yamaguchi et al. |
| 5,682,309 A | 10/1997 | Bartusiak et al. |
| 5,687,075 A | 11/1997 | Stothers |
| 5,691,893 A | 11/1997 | Stothers |
| 5,692,708 A | 12/1997 | Coleman et al. |
| 5,768,124 A | 6/1998 | Stothers et al. |
| 5,796,608 A | 8/1998 | Bunzemeier |
| 5,901,059 A | 5/1999 | Tao et al. |
| 5,936,792 A | 8/1999 | Kobayashi et al. |
| 6,026,793 A | 2/2000 | Yasui et al. |
| 6,092,919 A | 7/2000 | Calise et al. |
| 6,094,601 A * | 7/2000 | Popovich ............... 700/28 |
| 6,216,047 B1 | 4/2001 | Goto |
| 6,230,062 B1 | 5/2001 | Shah |
| 6,241,435 B1 | 6/2001 | Huang et al. |

FOREIGN PATENT DOCUMENTS

| | | |
|---|---|---|
| JP | 08272378 A * | 10/1996 |
| JP | 09198106 A * | 7/1997 |

* cited by examiner

ADAPTIVE CONTROL SYSTEM HAVING HEDGE UNIT AND RELATED APPARATUS AND METHODS

CROSS-REFERENCE TO RELATED APPLICATION

This application is a continuation under 35 U.S.C. §120 and 37 C.F.R. §1.53(b) of U.S. patent application Ser. No. 09/585,106, filed on May 31, 2000 now U.S. Pat. No. 6,618,631, which application claimed the benefit of provisional application No. 60/199,615, filed Apr. 24, 2000, which are hereby incorporated herein in their entirety by reference.

STATEMENT OF U.S. GOVERNMENT RIGHTS IN THE INVENTION

This invention was made with U.S. Government funding under Contract No. NAG8-1638 awarded by the National Aeronautics and Space Administration (NASA)—Marshall Space Flight Center and Contract No. F49620-98-1-0437 awarded by the Air Force Office of Scientific Research (AFOSR). The U.S. Government has certain rights in the invention.

FIELD OF THE INVENTION

The invention is directed to an adaptive control system and related method. More particularly, the invention is directed to an adaptive control system with the capability to prevent or reduce undesired adaptation of a control system due to selected characteristic(s) of the plant or control system.

BACKGROUND OF THE INVENTION

Adaptive control systems have the capability to adapt control response to changing conditions within the plant being controlled or the plant's operating environment. Adaptation to changing plant or environmental conditions provides enhanced control response for many kinds of plants, and may be required for certain types of plants that cannot be controlled with static control systems. However, conventional adaptive control systems have a tendency to adapt to plant or control system characteristics to which they should not. The control response of adaptive control systems can be greatly diminished when subjected to certain characteristic(s) of the plant or system, and can be rendered unstable in attempting to adapt to these characteristics. An example of a characteristic that could adversely affect an adaptive control system is a control or authority limit imposed on the control elements of an adaptive control system. If an operator generates a command signal that exceeds the ability of the control system or plant to respond, adaptation of the control system can render the control system unstable. It is desirable to reduce or prevent the impact of such characteristic(s) from adversely affecting the adaptive control system's performance.

SUMMARY OF THE INVENTION

The methods, apparatus, and system, of the invention overcome the disadvantages noted above.

A first method of the invention comprises generating a hedge signal to avoid adaptation to a characteristic of at least one of an adaptive control system and a plant controlled by such system. The first method can comprise modifying a commanded state signal with the hedge signal. The first method can also comprise generating a reference model state signal using the commanded state signal modified by the hedge signal. The first method also can comprise generating a tracking error signal based on the reference model state signal and a plant state signal, and generating an adaptive control signal to adapt control response of the adaptive control system. Through compensation for the characteristic in the tracking error signal, the adaptive control signal can be generated so as not to significantly adapt to the characteristic. Hence a characteristic of the plant or control system that would impair or be detrimental to control system's performance and/or stability can be hedged out of the adaptive portion of the control system to prevent adverse impact on control of the plant. The hedge signal can be generated based on a difference between a first signal derived from a plant model not having the characteristic to be hedged, and a second signal derived from a plant model having the characteristic. The first signal can generated based on an input control signal and a plant state signal in addition to the plant model not having the characteristic. The second signal can be generated using a command control signal and a plant state signal, in addition to the plant models with the characteristic. The input control signal can be generated based on a commanded state signal, a plant state signal, and an adaptive control signal, and the command control signal can be generated using the input command signal modified by a control allocation and a control characteristic imposed by a controller. The input control signal and command control signal can be used to hedge a characteristic of the control system to which adaptation is not to be performed. The method can also include generating a display based on the input control signal. An operator can use the display to generate a command control signal. In this aspect of the invention, the operator's control and response can be hedged.

A second method of the invention is executed by an adaptive control system. The second method comprises generating an input control signal based on a commanded state signal, a plant state signal, and an adaptive control signal. The second method also comprises generating a command control signal based on a commanded state signal, a plant state signal, an adaptive control signal, and further based on control allocation and a control characteristic of a controller used to generate the command control signal. The second method further comprises supplying the command control signal to an actuator, controlling a state of the plant based on the command control signal, sensing a state of the plant, and generating a plant state signal based on the sensing of the plant. The second method comprises generating a first signal based on the input control signal, the plant state signal, and a plant model without a plant characteristic to which the adaptive control system is not to adapt. The second method also comprises generating a second signal based on the command control signal, the plant state signal, and a plant model with the plant characteristic to which the adaptive control system is to adapt. The second method further comprises generating a hedge signal by differencing the first and second signals, and generating a reference model state signal by modifying the commanded state signal with the hedge signal to include the effect of the control allocation and control characteristic on plant state from the reference model state signal. The second method further comprises comparing the plant state signal and the reference model state signal, generating a tracking error signal based on the comparing step, and generating the adaptive control signal based on the tracking error signal. The second method can comprise generating a reference model signal based on the commanded state signal, the hedge signal, and a reference model signal derived from a reference model representing the target response of the plant, the reference model signal to generate the input control signal. The second method can also comprise generating a reference model signal based on the commanded state signal, the hedge signal and a reference model signal derived from a reference model representing the target response of the plant, the reference model signal, to generate the command control signal. The second method can also comprise generating a linear control signal based on the tracking error signal, generating a reference model signal based on the commanded state signal, the hedge signal, and a reference model, and generating a pseudo-control signal based on the linear control signal, the reference model signal, and the adaptive control signal, and the pseudo-control signal. The adaptive control signal can be generated with the plant state signal. The adaptive control signal can be generated with a neural network having connection weights adjusted based on the tracking error signal and the pseudo-control signal. The neural network maps the plant state signal to the adaptive control signal. The plant state signal can also be used to generate the adaptive control signal. The second method can comprise generating the commanded state signal based on a control action from an operator. The operator can be human, and the method can comprise generating a display based on the plant state signal. The display can be used by the operator to generate the commanded state signal. The second method can comprise generating the commanded state signal based on a signal generated by an operator that is a computer. The second method can also comprise generating a display for an operator based on the input control signal so that the operator can generate the command control signal based on the display.

An apparatus of the invention can be used in an adaptive control system for controlling a plant. The apparatus is a hedge unit coupled to receive at least one control signal and a plant state signal. The hedge unit generates a hedge signal based on the control signal, the plant state signal, and a hedge model including a first model having a characteristic to which the adaptive control system is not to adapt, and a second model not having the characteristic to which the adaptive control system is not to adapt. The hedge signal can be used in the adaptive control system to remove the characteristic from a signal supplied to an adaptation law unit of the adaptive control system so that the adaptive control system does not adapt to the characteristic in controlling the plant. The characteristic to be hedged by the hedge unit can be a time delay between generation of the commanded state signal by the controller at a time, and receipt by the controller of the plant state signal resulting from the commanded state signal generated at the time. Also, the characteristic can be a time delay between generation of a state by the plant and sensing of the state of the plant by the sensor to generate the plant state signal. Alternatively, the characteristic can pertain to a control limit of the actuator used to control the plant. The control limit can be due to actuator end points, actuator dynamics, a rate limit of the actuator, or quantization effects associated with the actuator, for example.

An adaptive control system of the invention is coupled to receive a command state signal indicative of a target state of a plant controlled by the adaptive control system. The adaptive control system comprises a controller coupled to receive the commanded state signal, a plant state signal, and an adaptive control signal. The controller generates an input command signal based on the commanded state signal, the plant state signal, the adaptive control signal, and a control model. The controller generates a command control signal based on the commanded state signal, the plant state signal, the adaptive control signal, the control model, control allocation of the controller, and at least one control characteristic of the controller. The controller is coupled to supply the command control signal to the plant to control the plant's state. The actuator is coupled to receive the command control signal, and affects physical control of the plant's state using the command control signal. The adaptive control system can comprise a sensor coupled to sense the plant state, that generates a plant state signal based on the sensed plant state. The adaptive control system also comprises a hedge unit coupled to receive the input control signal, the command control signal, and the plant state signal. The hedge unit generates a hedge signal to modify the command state signal based on the input control signal, the command control signal, the plant state signal, and a hedge model indicative of a characteristic of at least one of the plant and the adaptive control system, to remove the effect of the characteristic on a tracking error signal. The adaptive control system also comprises a reference model unit coupled to receive the command state signal and the hedge signal. The reference model unit generates a reference model state signal based on the commanded state signal and a hedge signal. The adaptive control unit also comprises a comparator unit coupled to receive the reference model state signal and the plant state signal. The comparator unit generates a tracking error signal based on a difference between the plant state signal and the reference model state signal. The adaptive control system also includes an adaptation law unit coupled to receive the tracking error signal. The adaptive control system generates the adaptive control signal based on the tracking error signal. The adaptation law unit is coupled to supply the adaptive control signal to the controller. The controller can generate the input control signal and the command control signal further based on the reference model state signal. The characteristic to be hedged by the adaptive control system can be time delay between generation of the commanded state signal by the controller at a particular time, and receipt by the controller of the plant state signal resulting from the commanded state signal generated at the particular time. Alternatively, the characteristic can be a time delay between generation of a state by the plant in response to the command control signal, and sensing of the state of the plant resulting from the command control signal. Further, the characteristic can be a control limit of the actuator used to control the plant. The control limit can be due to actuator end points, actuator dynamics, a rate limit of the actuator, or quantization effects of the actuator, for example. The commanded state signal can be generated by an operator, and the adaptive control system can comprise an operator interface unit coupled to receive the plant state signal. The operator interface unit relays the plant state to the operator. The command unit can be used by the operator to generate the command state signal based on the operator's control action. The operator interface can be a display generated based on the plant state signal. The operator can be a human being that generates the control action to the command unit to generate the commanded state signal. The commanded state signal is generated by a machine operator based on the plant state signal. The adaptation law unit can comprise a neural network having connection weights determined by the tracking error signal. The neural network can map the plant state signal to the adaptive control signal based on the connection weights to generate the adaptive control signal. The controller can generate a pseudo-control signal based on the commanded state signal and the plant state signal. The controller can be coupled to supply the pseudo-control signal to the neural network to adjust the connection weights of the neural network. The controller can comprise a dynamic inversion unit to generate the command control signal.

These together with other objects and advantages, which will become subsequently apparent, reside in the details of construction and operation of the invented methods, apparatus, and article as more fully hereinafter described and claimed, reference being made to the accompanying drawings, forming a part hereof, wherein like numerals refer to like parts throughout the several views.

DETAILED DESCRIPTION OF THE INVENTION

Figure 1:
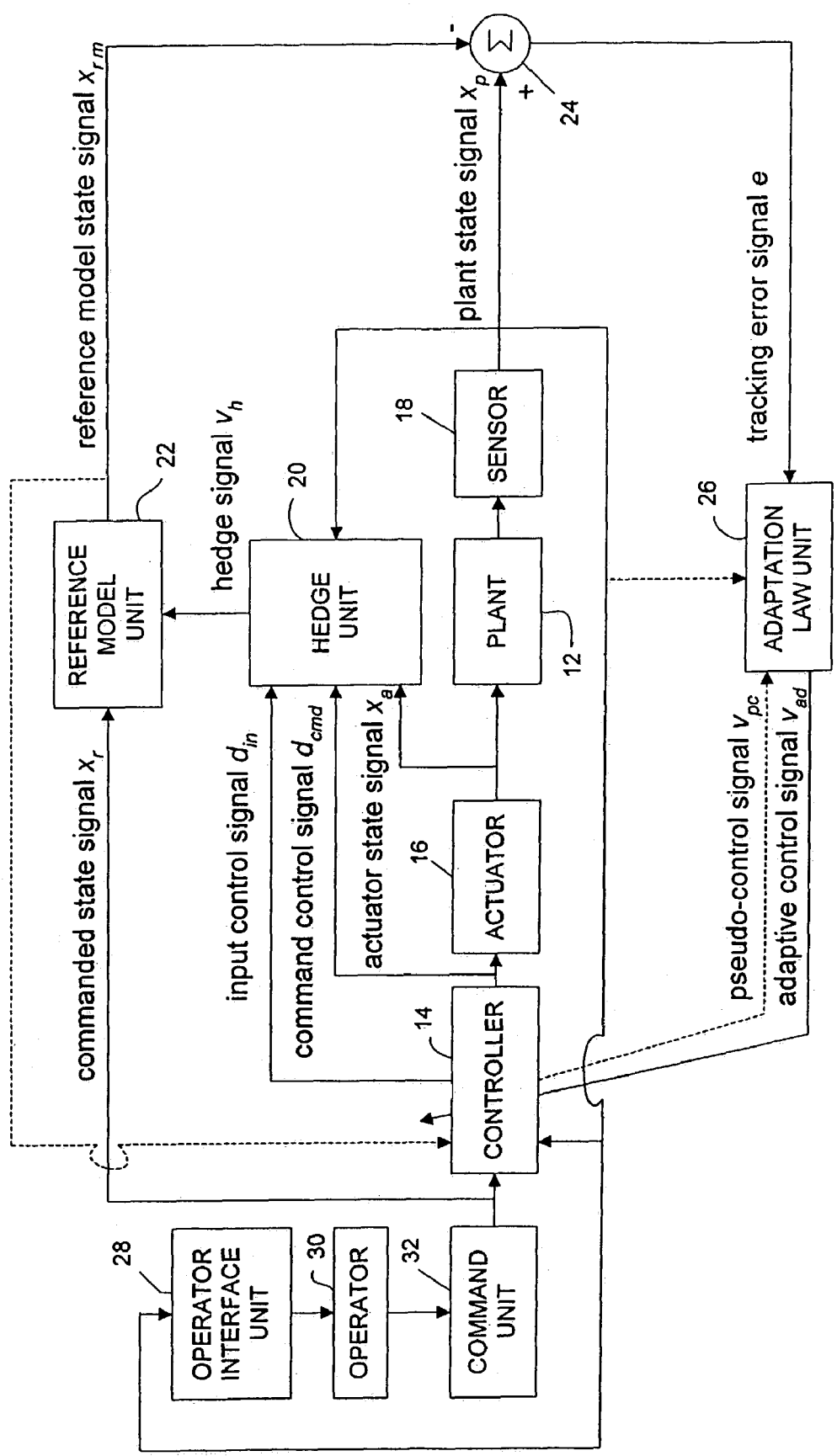
FIG. 1 is a general block diagram of the adaptive control system of the invention that uses a hedge signal to hedge against a characteristic to which the adaptive control system is not to adapt.

As used herein, the following terms have the following definitions:

"Actuator" can be virtually any device capable of affecting the state of a plant to control a degree of freedom thereof. Such actuator can be a motor, motor-driven screw, a hydraulic cylinder, a pump or valve controlling a stream of air, a thermal heater, a compressor or suction generator, or other device.

"Adaptive control system" means a control system having the capability to adapt to changes in a controlled plant or its environment over time.

"Characteristic" is a property of a plant or control system that has an effect for which adaptation of the control system is not to be performed. The characteristic can be a time delay between generation of a command signal and sensing and report of the plant state resulting from the command signal to the control system. The characteristic can also be a control limit such as actuator end points, e.g., extreme positions, temperatures, pressures, etc. obtainable by the actuator, actuator dynamics, rate limits, quantization effects, and possibly others. The characteristic can also be a feature of a sensor, for example, the time delay from change of a plant state to sensing of that changed plant state by the sensor. The characteristic can also be an operator's control or response.

"Control limit" is a limit on the capability of a control system to control a plant. A control limit can also be imposed by limitations in the actuators used to control the plant. These limitations can include actuator end points, e.g., extreme positions, temperatures, pressures, etc. obtainable by the actuator, actuator dynamics, rate limits, quantization effects, and possibly others. Control limits could also be imposed intentionally for a variety of reasons. Adaptive control systems are sensitive to control limits that can cause the adaptive control systems to lose stability. The invention provides the capability to compensate for control limits to permit stable control of the plant with the adaptive control system.

"Hedge" means to reduce or prevent adaptation of an adaptive control system to a characteristic.

"Hedge model" is a model of one or more elements of the system or plant with and without a characteristic that is to be hedged. A hedge model may be a model of a plant, a control system, e.g., an actuator or sensor, an operator, or any other feature of the control system or plant to which the control system is not to adapt.

"Operator" can be a human or computer, for example, that senses a plant state using a plant state signal, and generates a commanded state signal to control the plant.

"Plant" refers to a system controlled by a control system. For example, the plant can be an aircraft, spacecraft, space-launch vehicle, satellite, missile, guided munition, automobile, or other vehicle. The plant can also be a robot, or a pointing or orientation system such as a satellite orientation system to orient power-generation panels, a transceiver, or a docking mechanism. Such plant can also be a braking system, an engine, a transmission, or an active suspension, or other vehicle subsystem. The plant could be a manufacturing facility or a power generation facility. The plant could also be virtually any controllable system.

"Sensor" can be virtually any device(s) for sensing a degree of freedom of a plant's state, whether alone or in combination with one or more other sensors, to generate a measurement or estimate of plant state. The sensor can be virtually any device suitable for sensing information regarding a plant's state. For example, the sensor could be a gyroscope for detecting orientation of a vehicle such as an aircraft, i.e., pitch or roll attitudes or side slip. The sensor can also be a temperature or pressure sensor, a position, velocity, or inertial sensor.

"(s)" means one or more of the thing meant by the word preceding "(s)". Thus, characteristic(s) means one or more characteristics.

The adaptive control system 10 of FIG. 1 operates in a control cycle that is repeatedly executed to control the plant 12 on an ongoing basis, at least until control is terminated.

The basic function of the system 10 is to generate a commanded control signal $d_{cmd}$ using a commanded state signal $x_r$, a plant state signal $x_p$ an adaptive control signal $v_{ad}$, and optionally a reference model state signal $x_{rm}$. In the case of the first execution of the control cycle, when previous values of the plant state signal $x_p$ and the adaptive control signal $v_{ad}$ are employed, they are assigned predetermined values, respectively. The commanded state signal $x_r$ is used by the controller 14 along with the plant state signal $x_p$ and an adaptive control signal $v_{ad}$ to generate at least one control signal d. If adaptation to one or more characteristics of the controller 14 is to be avoided, the controller 14 is implemented to generate an input control signal $d_{in}$ that is the control signal d generated by the controller 14 before imposition of the characteristic(s) on such control signal, and a command control signal $d_{cmd}$ that is the input control signal $d_{in}$, modified by the controller's characteristic. The controller 14 is coupled to supply the command control signal $d_{cmd}$ to the actuator 16 that controls the state of the plant 12. The plant state is sensed by the sensor(s) 18 to generate a plant state signal $x_p$. The hedge unit 20 is coupled to receive the input control signal $d_{in}$ and the command control signal $d_{cmd}$ for the control cycle under execution from the controller 14. In addition, the hedge unit 20 is coupled to receive the plant state signal $x_p$, and optionally the actuator state signal x. The hedge unit 20 uses a plant model to predict the plant states resulting from the input command signal $d_{in}$ and the command control signal $d_{cmd}$, and generates a hedge signal $v_h$ based on a difference between these two predicted plant states. Therefore, the hedge unit 20 generates the hedge signal $v_h$ to isolate the contribution to plant state that results from the presence of the control characteristic(s) in the command control signal $d_{cmd}$. In addition, the hedge unit 20 can impose a plant model without one or more plant characteristic(s) for which adaptation is not to be performed by the system 10, and a plant model that includes the plant characteristic(s). By using the plant model without the plant characteristic to modify the input control signal $d_{in}$ to generate a first signal and by using the plant model with the characteristic(s) to modify the command control signal $d_{cmd}$ to generate a second signal, the hedge unit 20 can generate the hedge signal $v_h$ to isolate the contribution to plant state that results from the presence of the plant characteristic. The hedge unit 20 is coupled to supply the hedge signal $v_h$ to the reference model unit 22. The reference model unit 22 is also coupled to receive the commanded state signal $x_r$. The reference model unit 22 uses the hedge signal $v_h$ and a reference model indicating the target state of the plant based on the commanded state, to modify the commanded state signal $x_r$ to include the contribution to plant state caused by the characteristic(s) to be hedged. The comparator 24 is coupled to receive the reference model state signal $x_{rm}$ and the plant state signal $x_p$, and generates a tracking error signal e. The comparator 24 can generate the tracking error signal e by differencing the plant state signal $x_p$ and the reference model state signal $x_{rm}$ to generate the tracking error signal e. The comparator 24 is coupled to supply the tracking error signal e to the adaptation law unit 26. Because the characteristic(s) for which no adaptation of control response is to be made has been removed, at least partially, from the tracking error signal e, the adaptation law unit 26 will necessarily not adapt to such characteristic(s). Accordingly, the presence of the characteristic(s) has no impact on performance of the adaptation law unit 26. The adaptation law unit 26 generates an adaptive control signal $v_{ad}$ based on the tracking error signal e. The adaptation law unit 26 can optionally be coupled to receive the plant state signal $x_p$ as indicated by the broken line in FIG. 1, for use in generating the adaptive control signal $v_{ad}$. In addition, the adaptation law unit 14 can be coupled to receive a pseudo-control signal $v_{pc}$ generated by the controller 14 for use by the adaptation law unit 26 in generating the adaptive control signal $v_{ad}$.

Figure 2:
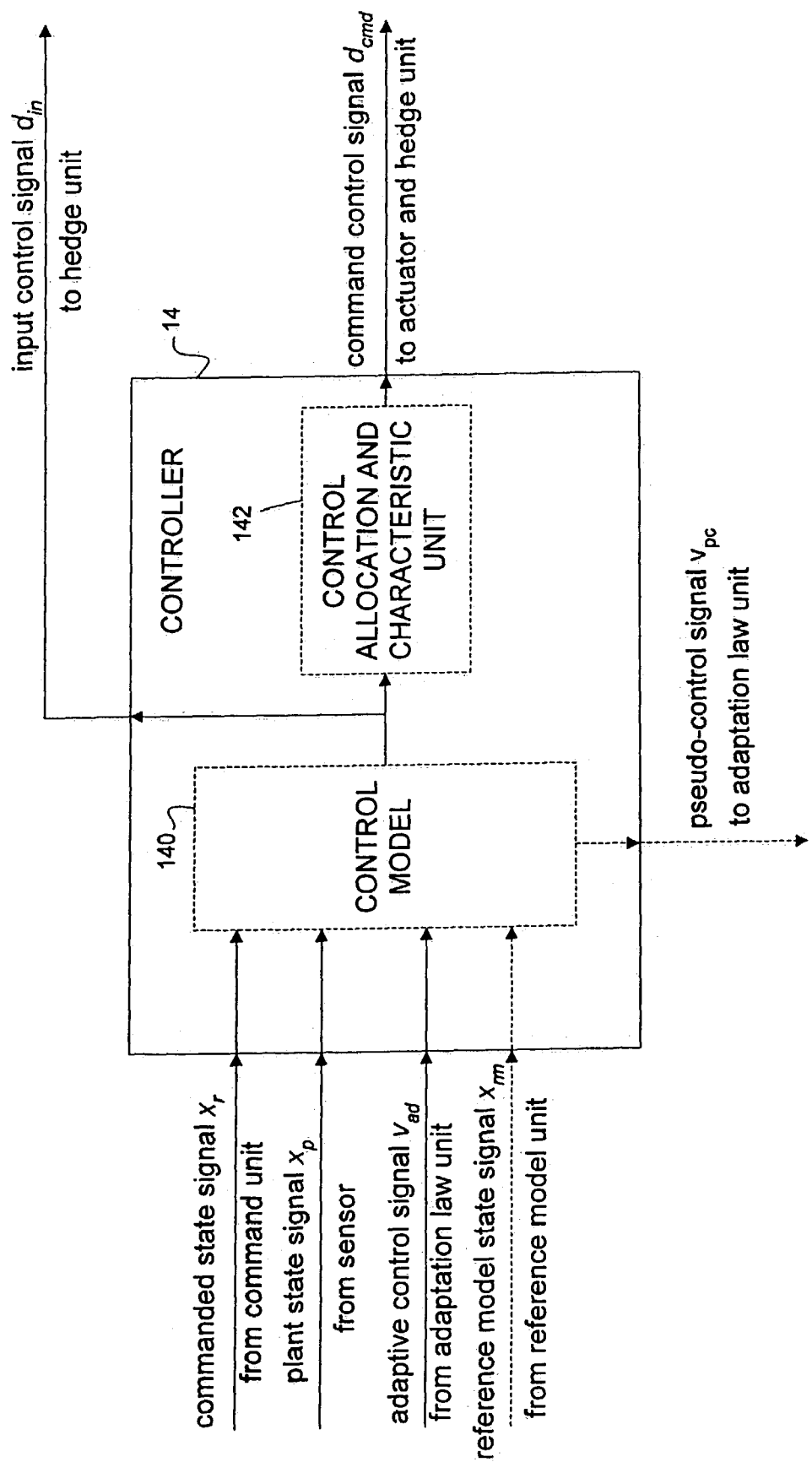
FIG. 2 is a block diagram of a controller of the adaptive control system that generates a command control signal to control an actuator affecting a state of a plant.

In FIG. 2, the controller 14 includes a control model 140 and a control allocation and characteristic unit 142. The control model 140 and the control allocation and characteristic unit 142 can be implemented as software modules within the hedge unit 14. The control model 140 is basically a software implementation of the control law to be implemented by the adaptive control system 10 to control the plant 12. The control model 140 is coupled to receive either the commanded state signal $x_r$, or the reference model state signal $x_{rm}$, and is also coupled receive the plant state signal $x_p$, and the adaptive control signal $v_{ad}$. The control model 140 maps these signals to the input control signal $d_{in}$. Those of ordinary skill in the art will understand how to generate a control law appropriate for a plant controlled by the adaptive control system 12. For example, the control model 140 can be a linear proportional plus derivative, or proportional plus integral control law implemented in a software module or function. The control model 140 is coupled to supply the input control signal $d_{in}$ to the control allocation and characteristic unit 142. The unit 142 maps the input control signal $d_{in}$ to the control signal $d_{cmd}$. The unit 142 can map the input control signal $d_{in}$, to the control signal $d_{cmd}$ so as to allocate control responsibility for the plant's controlled degree of freedom based on a predetermined scheme. For example, the plant 12 could be an aircraft configured so the ailerons on both wings can be controlled to achieve a commanded roll attitude. The unit 142 can serve to allocate the amount of aileron deflection to the two actuators that control the wing ailerons so as to influence the roll attitude commanded by the input control signal $d_{in}$, The unit 142 can include the on-line identification of a model of the plant and the optimal or near-optimal allocation of multiply-redundant control effectors based on the solution of an optimization scheme that employs either the identified plant model or a stored model of the plant. The unit 142 can also impart control characteristic(s) to the input control signal $d_{in}$ to generate the control signal $d_{cmd}$. Such control characteristic (s) could be control limits such as actuator end points that cannot be exceeded due to limitations of the actuator or associated control linkages. Alternatively, the control characteristic(s) could be conservative authority limits placed on the control signal $d_{in}$, to insure the actuator end points are never encountered. For example, the actuator may be capable of moving a control surface by ±21 degrees of angle. If the input control signal $d_{in}$, designates 25 degrees of angle, the unit 142 will clip the input control limit $d_{in}$, to produce a command control signal of 20 degrees of angle. Another control limit may pertain to an actuator's rate limit. It is possible that the input command signal $d_{in}$, may command the actuator 16 to respond more rapidly than it is able. Accordingly, the unit 142 can be programmed to generate the command control signal $d_{cmd}$ to move the actuator 16 more gradually as compared to the input control signal $d_{in}$. As another example, the actuator 16 may be able to move only in quantized steps. The unit 142 can be used to map the control signal $d_{in}$, to the command control signal $d_{cmd}$ so that the command control signal is quantized. In addition, the unit 142 can be used to impose authority limits on the actuator 16. Thus, although an actuator 16 can be capable of actuation to the point of endangering the plant, the unit 142 can be used to impose a control limit on the actuator 16.

Therefore, for example, if the operator 30 is an auto-pilot monitored by a human pilot to take control in emergency situations, the auto-pilot can be limited to control the aircraft plant 12 to limits set by the unit 142. Control limits set by the unit 142 can also be imposed by the sensor 18. For example, if the actuator 16 can change the state of the plant 12 faster than the sensor 18 can sense the resulting changes, the unit 142 can limit the input control signal $d_{in}$ to generate the command control signal $d_{cmd}$ to change the plant's state in a manner the sensor 18 can accurately sense. Yet another example of a control limit is the finite time required of a processor to process the various input signals to the controller and to generate the controller's output signals.

Figure 3:
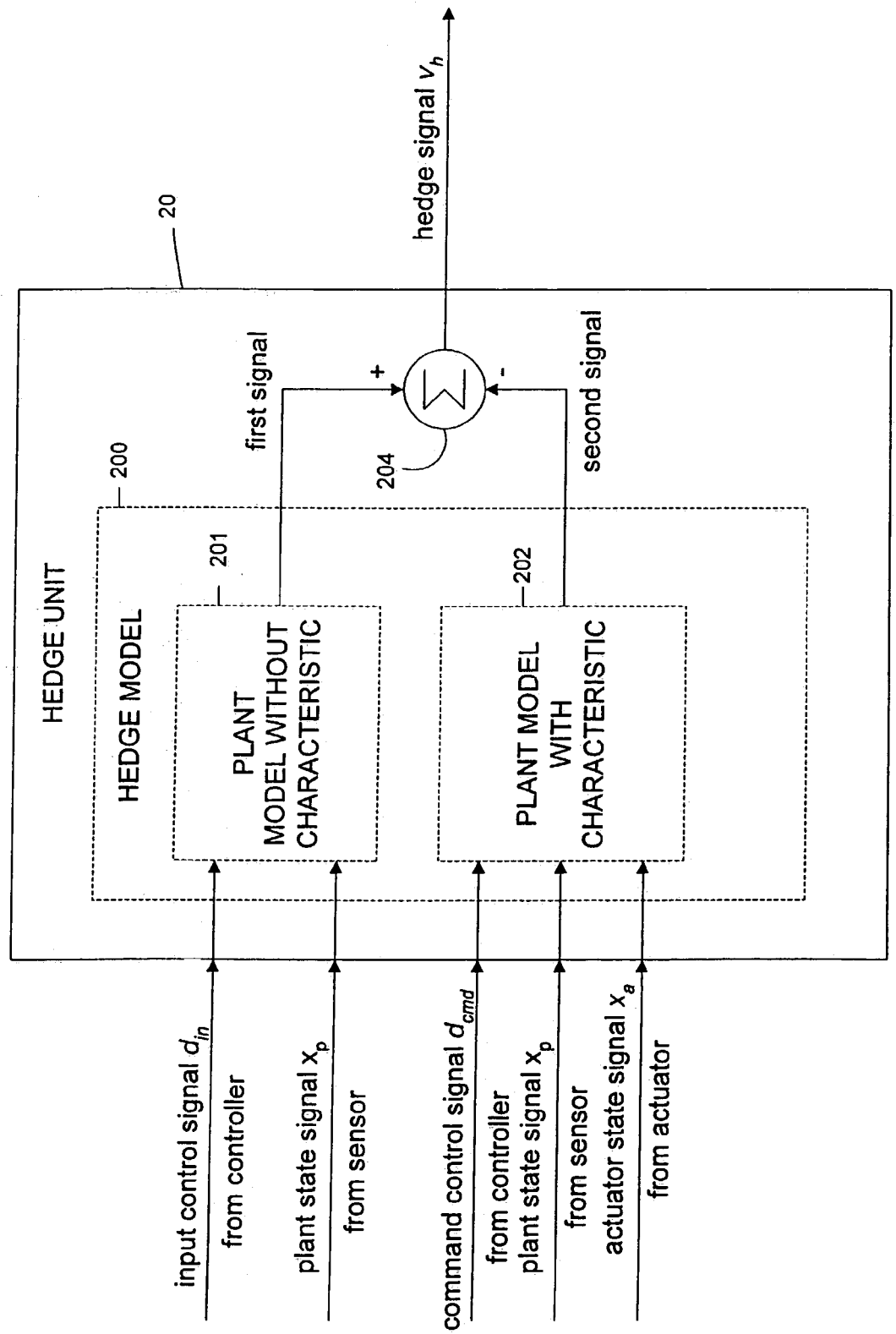
FIG. 3 is a block diagram of a hedge unit of the adaptive control system.

Turning now to FIG. 3, the hedge unit 20 includes a hedge model 200 having a plant model 201 without the plant characteristic that is to be hedged and a plant model 202 with the plant characteristic(s) that is/are to be hedged, and a comparator 204. These elements of the hedge unit 20 can be implemented as one or more software modules or functions within the hedge unit 20. The plant model 201 without the characteristic(s) is coupled to receive the input control signal $d_{in}$, and the plant state signal $x_p$. The plant model 202 with the characteristic(s) generates a first signal that indicates the predicted plant response to the input control signal $d_{in}$ given the plant state signal $x_p$. The plant model 202 with the plant characteristic(s) that is to be hedged is coupled to receive the command control signal $d_{cmd}$ and the plant state signal $x_p$. Based on these signals, the plant model 202 with the characteristic(s) to be hedged is used to generate a second signal. The comparator 204 is coupled to receive the first signal from the plant model 201 not having the plant characteristic to be hedged, and the plant model 202 having the characteristic(s) to be hedged. The comparator 204 differences the first and second signals to generate the hedge signal $v_h$. The hedge signal $v_h$ in effect isolates the plant and/or system characteristic(s) that are to be hedged.

Figure 4:
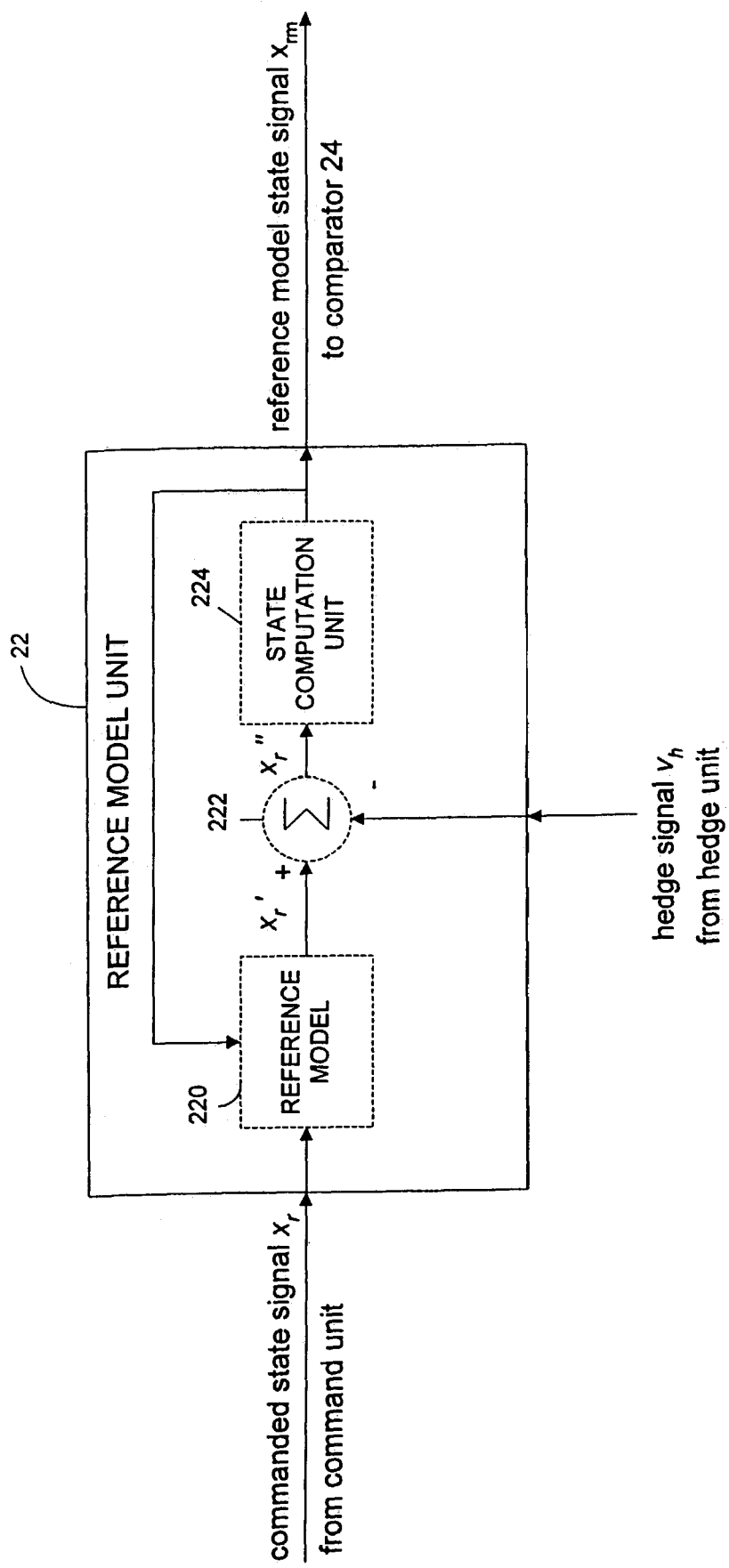
FIG. 4 is a block diagram of a reference model unit of the adaptive control system.

In FIG. 4, details of a possible implementation of the reference model unit 22 are shown. The reference model unit 22 includes a reference model 220, a comparator 222, and a state computation unit 224. The reference model 220 receives the commanded state signal $x_r$, and the reference model state signal $x_{rm}$ from the state computation unit 224. The reference model 220 generates a signal $x_r'$ based on the commanded state signal $x_r$ and the reference model state signal $x_{rm}$. The reference model 220 is a software module or function that maps the commanded state signal $x_r$, to the reference model state signal $x_{rm}$. The reference model state signal $x_{rm}$ represents the target plant state corresponding to the commanded state signal $x_r$. The signal $x_r'$ from the reference model 220 is supplied to the comparator 222. The comparator 222 also receives the hedge signal $v_h$ from the hedge unit 20. The comparator 222 subtracts the hedge signal $v_h$ from the signal $x_r'$ to generate the signal $x_r''$. The signal $x_r''$ is supplied to the state computation unit 224. The state computation unit 224 computes the reference model state signal $x_{rm}$ from the signal $x_r''$. More specifically, the state computation unit 224 computes scalar, derivative and/or integral values of the signal $x_r''$ according to the form or order of the reference model. Accordingly, the state computation unit 224 generates the reference model state signal $x_{rm}$ as a vector with scalar, integral and/or derivative terms using the commanded state signal $x_r$ as modified in the unit 22 by the hedge signal $v_h$, and the reference model 222. The state computation unit 224 supplies the resulting reference model state signal $x_{rm}$ or predetermined terms thereof as a feedback signal to the reference model 220. The state computation unit 224 also supplies the reference model state signal $x_{rm}$ to the comparator 24. The reference model state signal $x_{rm}$ includes the reference model response to the characteristic to be hedged so that it can be used in the comparator 24 to extract from the plant state signal $x_p$ the contribution to plant state resulting from the presence of the characteristic(s). Accordingly, the effect of the characteristic is eliminated or at least reduced from the tracking error signal e so that the adaptation law unit 26 will not adapt to the characteristic's impact on the system 10 or the plant 12. Of course, it may not be possible to remove all impact of the characteristic from the tracking error signal e. However, enough of the impact of the characteristic should be removed from the tracking error signal e so that system control of the plant will not be compromised. Satisfaction of this objective depends upon pre-specifications for the system based on control performance objectives, control stability, and the nature of the control system 10 and plant 12.

Figure 5:
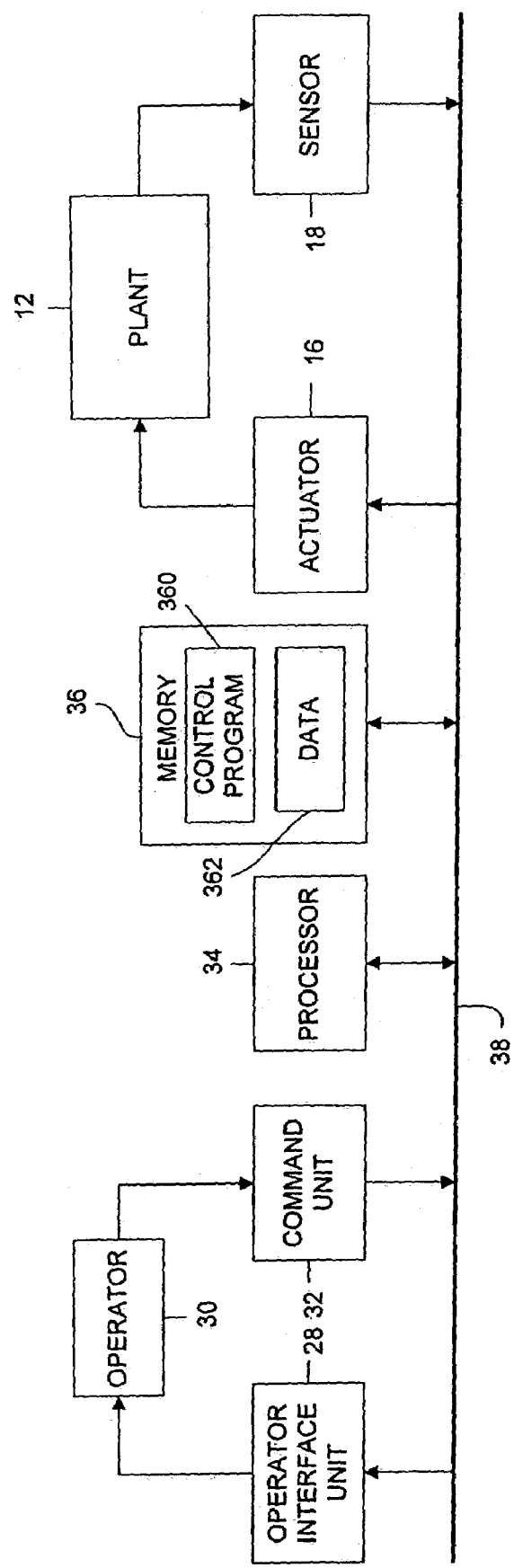
FIG. 5 is a view of a processor-based system for implementing the adaptive control system of FIGS. 1–4.

FIG. 5 is a possible implementation of the system 10. The actuator 16, the sensor 18, the operator interface unit 28, the command unit 32, a processor 34, and a memory 36 are coupled to a bus 38. The processor 34 can be a microprocessor or a microcontroller, for example. For example, the processor 34 could be a microprocessor with 64-bit word size operating at a 1.0 GHz instruction execution cycle. The processor 34 can be a Pentium® III microprocessor commercially-available from Intel Corporation, Santa Clara, Calif., or an Athlon® microprocessor from Advanced Micro Devices®, Inc., Sunnyvale, Calif. The memory 36 stores a control program 360 and data 362. The control program 360 is executed by the processor 34 in the performance of a control cycle of the adaptive control system 10. The control program 360 includes the software modules used to implement the controller 14, the hedge unit 20, the reference model unit 22, the comparator 24, and the adaptation law unit 26. The data 362 includes data used by the processor 34 in executing the software modules of the control program 360 or temporary data generated by the processor 34 as it executes the control program 360. In the operation of the system 10 of FIG. 5, the sensor 18 has sensed the state of plant 12 to generate the plant state signal $x_p$. The plant state signal $x_p$ has been stored as data 362 stored in the memory 36 via the bus 38. Also, signals required for use in the next control cycle which could include the adaptive control signal $v_{ad}$ and the plant state signal $x_p$ and possibly other signals as well, are stored as data 362 in the memory 36. Alternatively, the adaptive control signal $v_{ad}$ can be generated in the control cycle under execution using a fixed-point solution. The command unit 32 writes the commanded state signal $x_r$ for the current control cycle as data 362 stored in the memory 36. In executing its control program 360 over the control cycle under execution, the processor 34 reads the commanded state signal $x_r$ from the memory 36. The processor 34 also reads the plant state signal $x_p$ and the adaptive control signal $v_{ad}$ and generates the input control signal $d_{in}$ and the command control signal $d_{cmd}$. Alternatively, the plant state signal $x_p$ or a construction thereof from the sensor signal derived from a time after execution of the previous control cycle can be stored in memory for use in the next control cycle. The processor 34 supplies the command control signal $d_{cmd}$ to the actuator 16 that controls the state of the plant 12 based thereon. The processor 34 also executes the control program 360 to generate the hedge signal $v_h$ based on the input control signal $d_{in}$ the command control signal $d_{cmd}$, the plant state signal $x_p$, and optionally also on the actuator state signal $x_a$. Processor 34 further executes the control program 360 to generate the reference model state signal $x_{rm}$. The processor 34 subtracts the reference model state signal $x_{rm}$, from the plant state signal $x_p$ to generate the tracking error signal e. The processor 34 uses the tracking error signal e and optionally also the plant state signal $x_p$ and a pseudo-command signal $v_{pc}$, to generate the adaptive control signal $v_{ad}$. The processor 34 can store any signals needed for the next control cycle in the memory 36.

Figure 6:
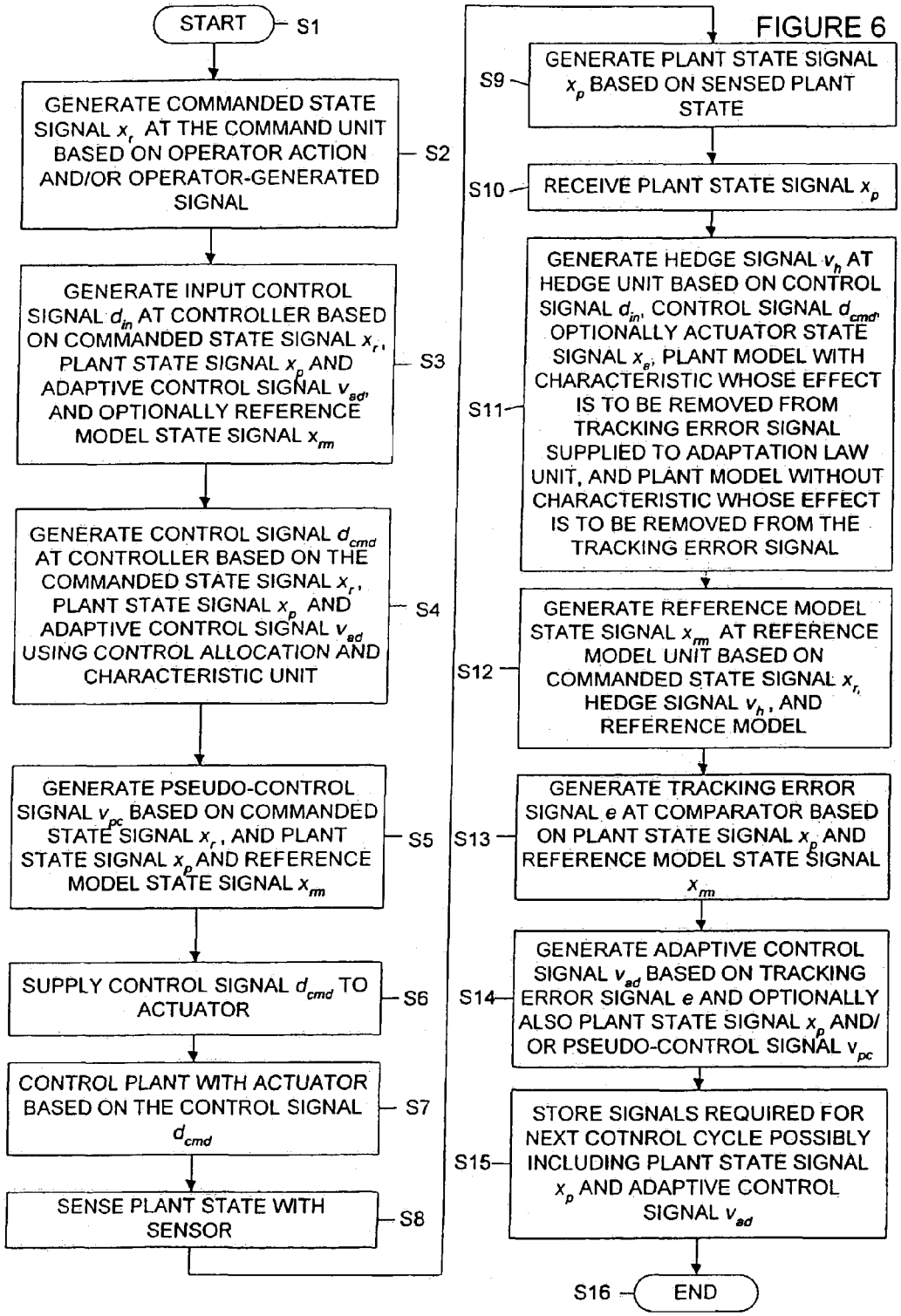
FIG. 6 is a flowchart of a method of the invention used to generate a hedge signal to prevent or reduce adaptation of the adaptive control system of FIGS. 1–4 to the characteristic that is to be hedged.

The method of FIG. 6 follows operation of the adaptive control system 10 of FIGS. 1–5 over a control cycle. In step S1 of FIG. 6, the method begins. In step S2 of FIG. 6, the command unit 32 generates the commanded state signal $x_r$, based on the operator's action and/or operator-generated signal. In step S3 the controller generates the input control signal $d_{in}$ based on the commanded state signal $x_r$, the plant state signal $x_p$ from sensor 18 and the adaptive control signal $v_{ad}$ generated by the adaptation law unit 26. Alternatively, the commanded state signal $x_r$ is first used by the reference model unit 22 to generate the reference model state signal $x_{rm}$. The controller 14 generates the input control signal $d_{in}$ based on the reference model state signal $x_{rm}$, and the plant state signal $x_p$ from the sensor 18, and the adaptive control signal $v_{ad}$ generated by the adaptation law unit 26. In step S4 the controller 14 generates the control signal $d_{cmd}$ based on the commanded state signal $x_r$, and the plant state signal $x_p$ and adaptive control signal $v_{ad}$ using the control allocation and characteristic unit 142 of the controller 14. In optional step S5 the controller 14 generates a pseudo-control signal $v_{pc}$ based on the commanded state signal $x_r$, and the plant state signal $x_p$ and the reference model state signal $x_{rm}$. In step S6, the controller 14 supplies the control signal $d_{cmd}$ the actuator 16 to control the plant 12. In step S7 the sensor 18 senses the plant state. In step S9 the controller 14 generates the plant state signal $x_p$ based on the sensed plant state. In step S10 the processor 34 receives the plant state signal $x_p$. In step S11 the hedge unit 20 generates the hedge signal $v_h$ based on the input control signal $d_{in}$, the command control signal $d_{cmd}$, optionally on the actuator state signal $x_a$, the plant model with the characteristic whose effect is to be removed from the tracking error signal e supplied to the adaptation law unit 26, and the plant model without the characteristic whose effect is to be removed from the tracking error signal. In step S12 the reference model unit 22 generates the reference model state signal $x_{rm}$, based on the commanded state signal $x_r$, the hedge signal $v_h$, and the reference model. In step S13 the comparator 24 generates the tracking error signal e based on the plant state signal $x_p$ and the reference model state signal $x_{rm}$. In step S14 the adaptive law unit generates the adaptive control signal $v_{ad}$ based on the tracking error signal e and/or the pseudo-control signal $v_{pc}$ generated by the controller 14. In step S15, the processor 34 stores any signals required for the next control cycle in the memory 36. Such signals might include the plant state signal $x_p$ and the adaptive control signal $v_{ad}$. In step S16 the method of FIG. 6 ends.

Figure 7:
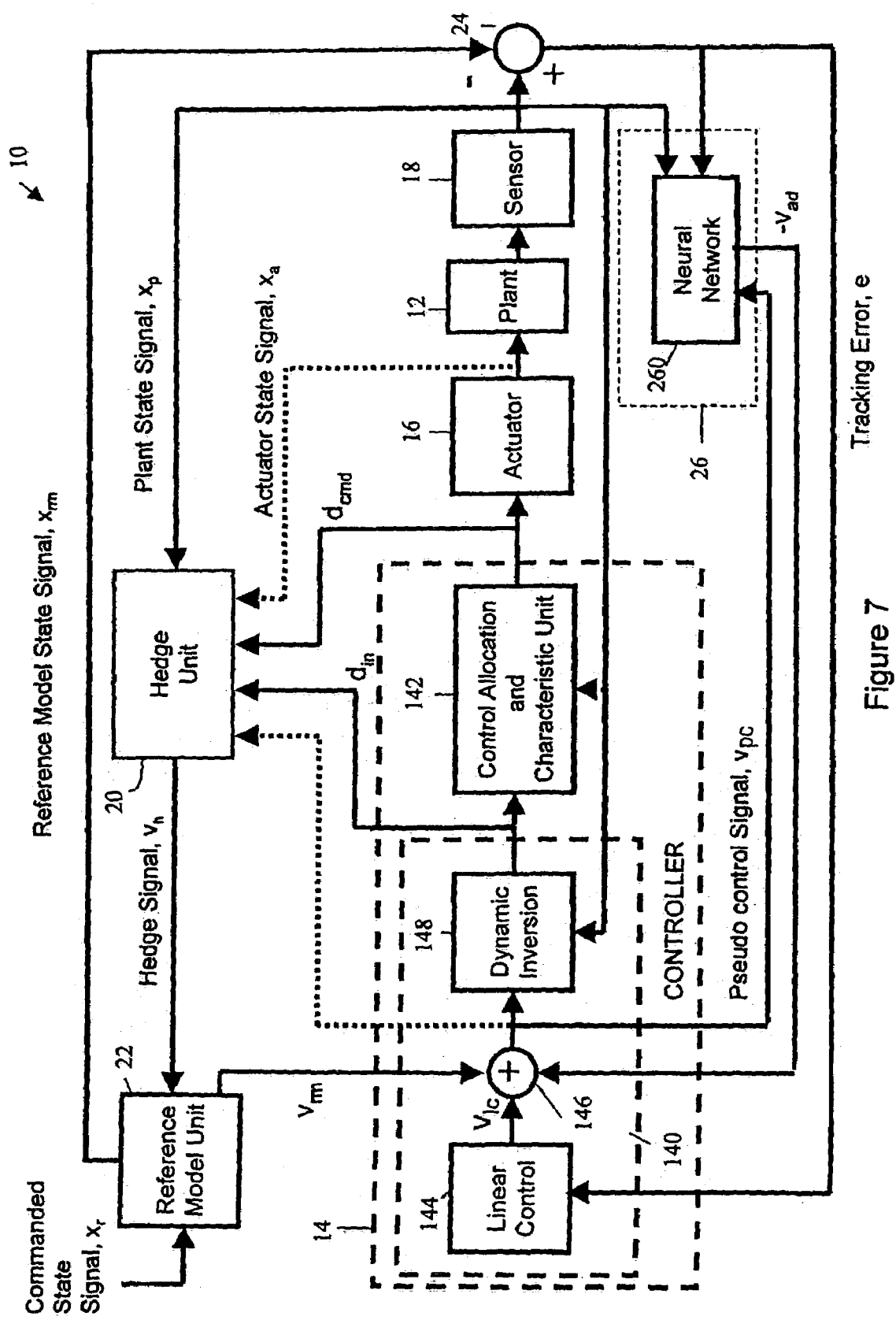
FIG. 7 is a block diagram of an adaptive control system that includes a neural network for generating an adaptive control signal based on a tracking error signal and a pseudo-control signal.

FIGS. 7–13 are views of an exemplary embodiment of the adaptive control system 10. In FIG. 7 the controller 14 comprises the control model 140 and the control allocation and characteristic unit 142. The control model 140 includes a linear control module 144, a summing unit 146, and an approximate dynamic inversion module 148. The linear control module 144 generates a linear control signal $v_{lc}$, based on the tracking error signal e. More specifically, the linear control module 144 applies a linear control law to map the tracking error signal e to the linear control signal $v_{lc}$. The reference model unit 22 generates the reference model signal $v_{rm}$ that is a subset of the vector of the reference model state signal $x_{rm}$. The linear control module 144 and the reference model unit 22 are designed to control the plant 12 for target system response and stability using design techniques well-known to those of ordinary skill in the art. In the exemplary embodiment of FIG. 7, the adaptation control unit 26 includes a neural network 260. The neural network 260 receives as inputs the plant state signal $x_p$ and a pseudo-control signal $v_{pc}$, and the tracking error signal e. The neural network 260 maps the plant state signal $x_p$ to the adaptive control signal $v_{ad}$ using connection weights adaptively set each control cycle by the tracking error signal e and the pseudo control signal $v_{pc}$. By updating the connection weights of the neural network 260 with successive control cycles, the system 10 is adaptive to changes over time in the plant 12 as well as the system 10. The pseudo-control signal $v_{pc}$ is used in part to adapt the connection weights of the neural network 260 generated in the control model 140. In the control model 140, the adaptive control signal $v_{ad}$ is subtracted from the sum of the reference model signal $v_{rm}$ and the linear control signal $v_{ad}$ in the summing unit 146 to generate pseudo-control signal $v_{pc}$. The pseudo-control signal $v_{pc}$ is supplied to the hedge unit 20 for optional use in generating the hedge signal $v_h$. The pseudo-control signal $v_{pc}$ is also supplied to a dynamic inversion unit 148 of the control model 140. The dynamic inversion unit 148 inverts the pseudocontrol signal $v_{pc}$ based on an inversion function representing the plant control response. The inversion function is a function of the plant state signal $x_p$ and the pseudo-control signal $v_{pc}$. The inversion function maps these signals to the input command signal $d_{in}$. The remainder of the adaptive control system 10 is similar in function and configuration to previously described embodiments.

Figure 8:
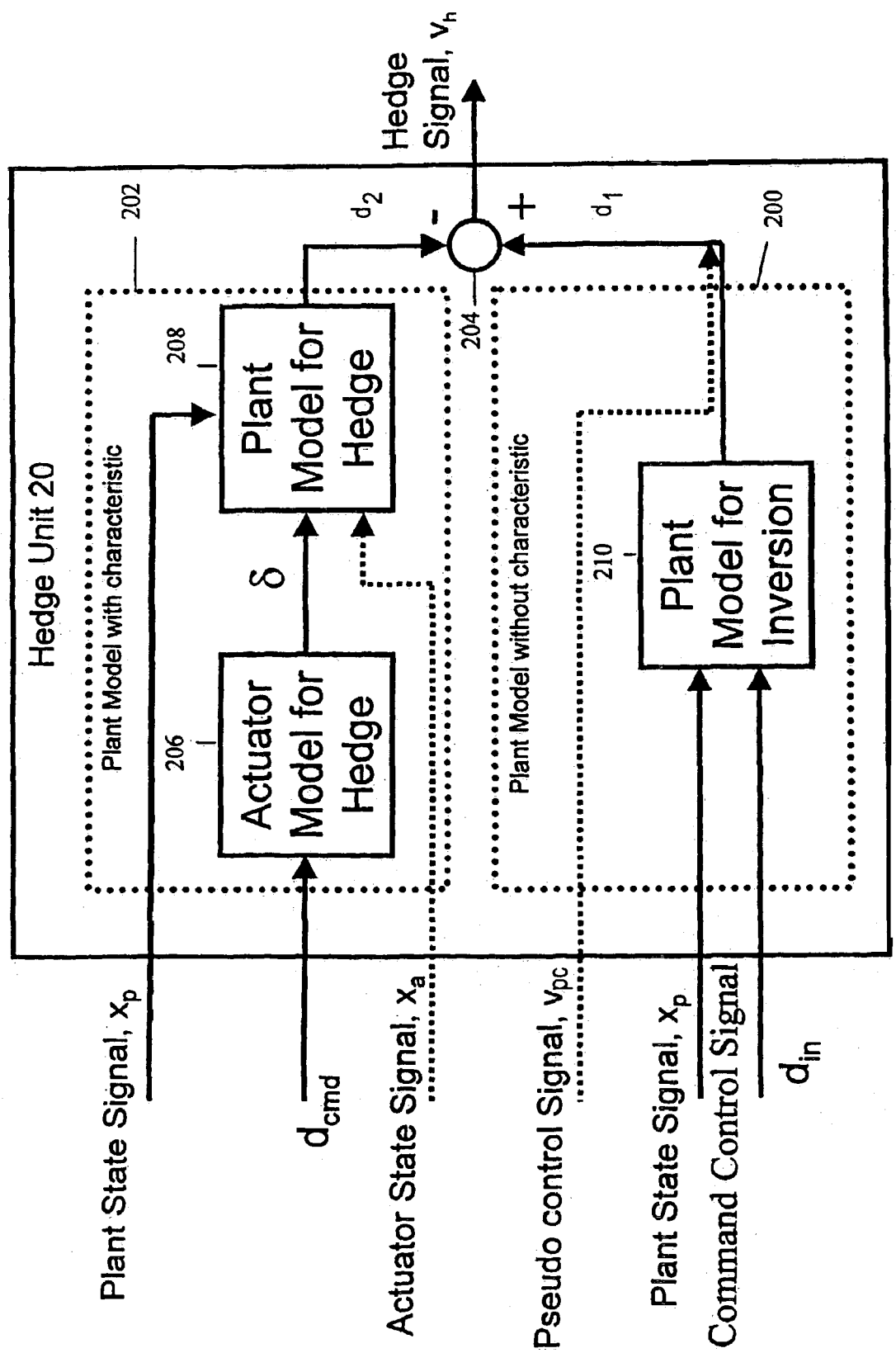
FIG. 8 is a relatively detailed block diagram of a hedge unit used with the adaptive control system of FIG. 7.

FIG. 8 is an exemplary embodiment of the hedge unit 20 of FIG. 7. In this embodiment, the first signal $d_1$ supplied to the comparator 204 can be generated in one of two ways. More specifically, the plant state signal $x_p$ and the input command signal $d_{in}$ can be supplied to the plant model 210 that includes an inversion function to generate the first signal $d_1$ based on these signals. Alternatively, the pseudo-control signal $v_{pc}$ can be supplied as the first signal $d_1$ directly to the comparator 204. The command control signal $d_{cmd}$ is supplied to the plant model 202 that includes an actuator model 206 for one or more characteristics of the actuator 16 to be hedged, and a plant model 208 with one or more characteristics of the plant 12 to be hedged. The command control signal $d_{cmd}$ is fed to the actuator model 206 to generate command signal $\delta$. The command signal $\delta$ is supplied to the plant model 208 along with the plant state signal $x_p$ for use in generating the second signal $d_2$ supplied to the comparator 204. The comparator 204 generates the hedge signal $v_h$ by subtracting the first and second signals $d_1$, $d_2$ to isolate the effect of the characteristics to be hedged.

Figure 9:
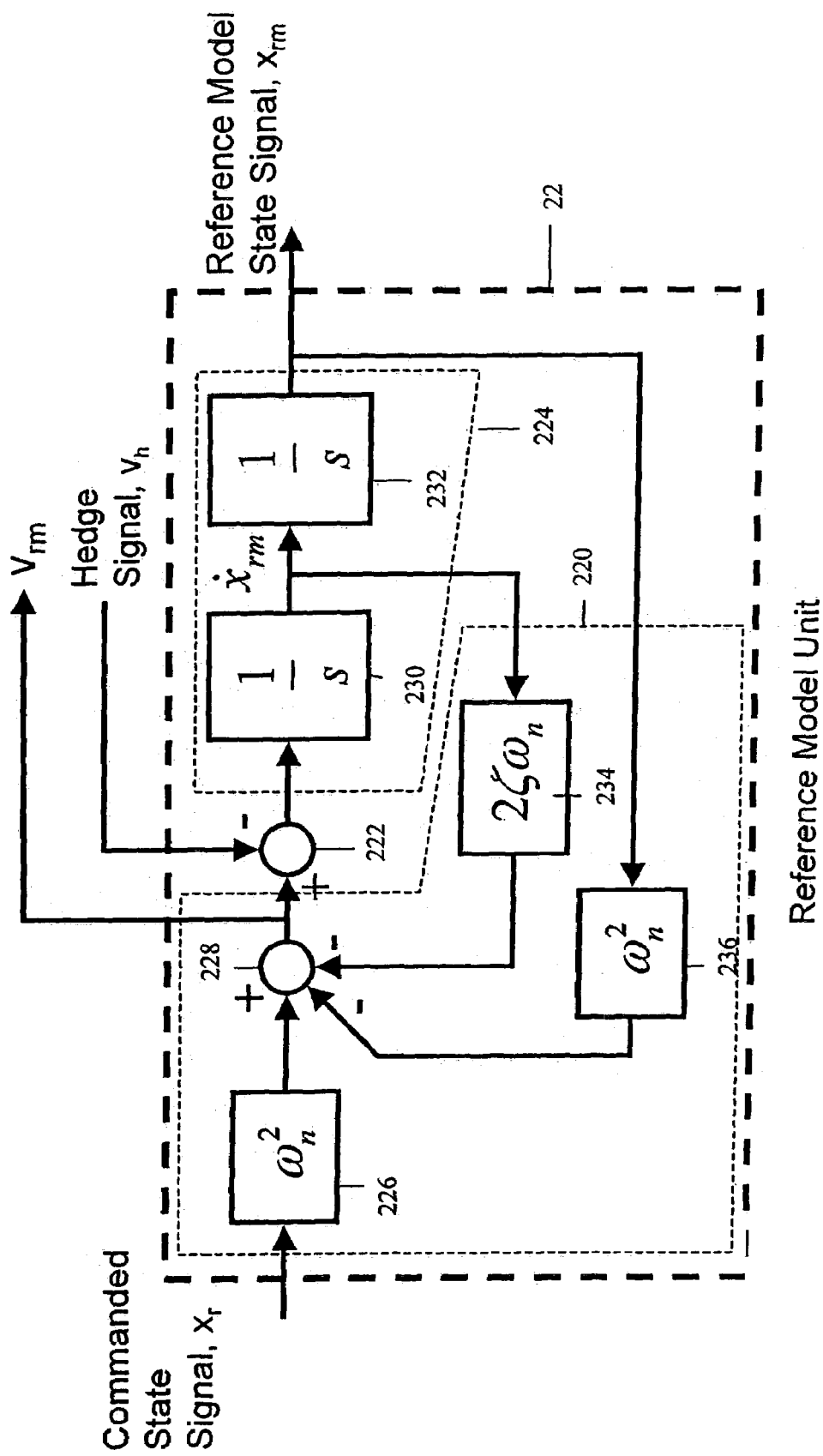
FIG. 9 is a relatively detailed block diagram of a reference model unit used to implement a second-order reference model to generate a target reference model state response to a commanded state signal.

In FIG. 9 a relatively detailed example of the reference model unit 22 is shown. The reference model unit 22 in this case is second-order, and has constant, derivative, and double derivative terms. The reference model unit 22 includes a comparator 222, a multiplier 226, a summing unit 228, integrators 230, 232, and multipliers 234, 236. The multiplier 226 multiplies the commanded state signal $x_r$, by a predetermined constant $\omega_n^2$ to generate a modified signal supplied to the summing unit 228. The summing unit 228 subtracts signals from the multipliers 234, 236 from the modified signal from the multiplier 228 to generate the reference model signal $v_{rm}$. The summing unit 228 supplies the reference model signal $v_{rm}$ to the controller 14. The summing unit 228 also supplies the reference model signal $v_{rm}$ to the comparator 222. The comparator 222 subtracts the hedge signal $v_h$ from the reference model signal $v_{rm}$ to generate a signal supplied to the integrator 230. The integrator 230 integrates the signal from comparator 222 to generate integrated signal $\dot{x}_{rm}$. The integrated signal $\dot{x}_{rm}$ is supplied to the integrator 232 to generate the reference model state signal $x_{rm}$ that in this case has a "constant" term, a derivative term, and a second-derivative term. The reference model state signal $x_{rm}$ is supplied to the comparator 24. The integrated signal $\dot{x}_{rm}$ from the unit 230 is also supplied to the multiplier 234 that multiplies this integrated signal by the constant $2\zeta\omega_n$ in which $\zeta$ and $\omega_n$ are constants, and supplies the resulting signal to the summing unit 228. The "constant" term from the reference model state signal $x_{rm}$ is also supplied to the multiplier 236 that multiplies this signal by the constant $\omega_n^2$ to generate a signal supplied to the summing unit 228. The signals from multipliers 234, 236 are subtracted from the signal from multiplier 226 to generate the reference model signal $v_{rm}$.

Figure 10:
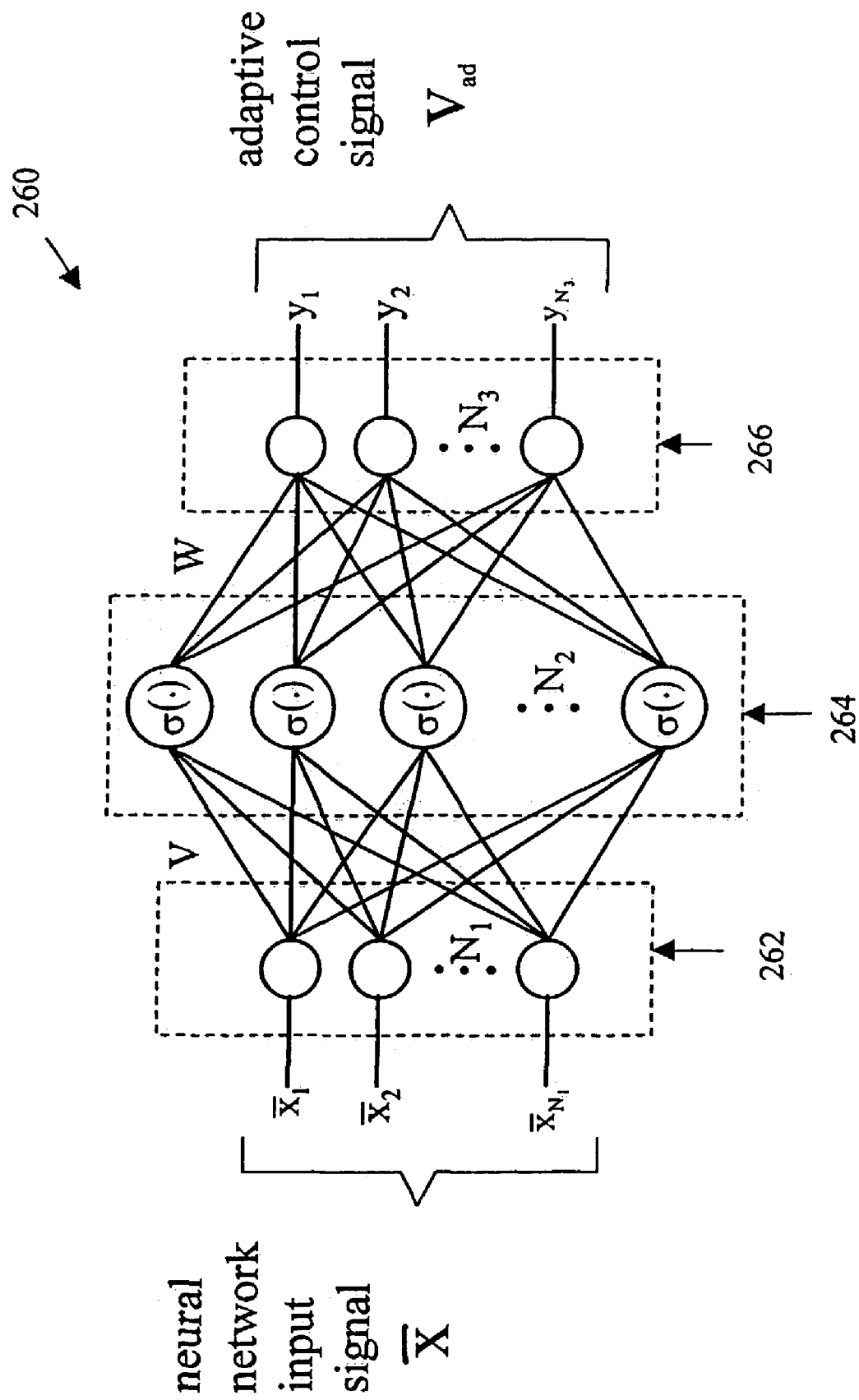
FIG. 10 is a relatively detailed view of a neural network that can be used to map a tracking error signal and a plant state signal to an adaptive control signal using connection weights set adaptively based on a tracking error signal, a pseudo-control signal, and the plant state signal.

FIG. 10 is a diagram of a neural network 260. The neural network 260 includes an input layer 262, a hidden layer 264, and an output layer 266. The input layer 262 has $N_1$ nodes receiving elements of the plant state signal $\bar{x}$ and the pseudo-control signal $v_{pc}$, $N_1$ being a positive integer. The $N_1$th nodes of the input layer 262 are multiplied by respective connection weights V to generate the input signals to the $N_2$ nodes of the hidden layer 264, $N_2$ being a positive integer. The weighted input signals to the hidden layer 264 are supplied as input signals to the sigmoidal activation function $\sigma(z)$ of the form:

$$\sigma(z) = \frac{1}{1+e^{-az}} \quad (1)$$

in which a is a predetermined constant and z represents the V-weighted input signals from the input layer 262. The outputs from the hidden layer 264 are weighted by the connection weights W, and are supplied as input signals to respective nodes $1-N_3$ of the output layer 266. These nodes add respective input signals to generate the adaptive control signal $-v_{ad}$. The mapping of the plant state signal $x_p$ to the adaptive control signal $v_{ad}$ performed by the neural network 260 can be expressed as:

$$v_{ad} = y_i = \sum_{j=1}^{N_2} \left[ w_{ij}\sigma\left(\sum_{k=1}^{N_1} v_{jk}\bar{x}_k + b_{v_j}\right) + b_{w_i} \right] \quad (2)$$
$$i = 1, 2, \ldots, N_3$$

where $N_1$, $N_2$, $N_3$ are the number of nodes in the input, hidden, and output layers 262, 264, 266, respectively, referenced by corresponding indexes k, j, i. The connection weights $v_{jk}$ and $w_{ij}$ are set adaptively by the states of the tracking error signal e and the $N_1$ inputs to the neural network input layer 262. The constants $b_{vj}$ and $b_{wi}$ are predetermined. In matrix form equation (2) can be expressed as:

$$v_{ad} = y = W^T\sigma(V^T\bar{x}) \quad (3)$$

in which $\bar{x}$ is the neural network input signal, $V^T$ is the transpose of the connection weight vector V, $\sigma$ is the sigmoidal activation function, $W^T$ is the transpose of the connection weight vector W, and $y = v_{ad}$ is the adaptive control signal. The signal $v_{ad}$ can either be multiplied by "–1" or mapped by the neural network 260 to generate the signal $-v_{ad}$ for supply to the controller 14.

The manner in which the tracking error signal e and the input layer signal are used to adapt the connection weights V and W is now described. The pseudo-control signal $v_{pc}$ is generated using the reference model signal $v_{rm}$, the linear control signal $v_{lc}$ and the adaptive control signal $v_{ad}$, as follows:

$$v_{pc} = v_{rm} + v_{lc} - v_{ad} \quad (4)$$

The pseudo-control signal $v_{pc}$ is related to the acceleration term of the reference model state. The pseudo-control signal can be further augmented by terms as may be required to support proof of boundedness. An example of a term is commonly referred to as the robustifying term and is well know to those of ordinary skill in the art. Dynamic inversion is used to reduce the control design problem to that of a control design for a linear, time-invariant plant. However, as is well-known to those of ordinary skill in this technology, use of an imperfect model in the dynamic inversion process can corrupt the desired relationship between acceleration of the plant state vector and the pseudo-control by an amount $\Delta$ often referred to as an inversion error. This relationship between acceleration of the plant state, pseudo-control, and the inversion error is defined in Equation (5).

$$\ddot{x}_p = v_{pc} + \Delta \quad (5)$$

The derivative of the tracking error signal e can be expressed as:

$$\dot{e} = Ae + b(\Delta + v_{ad}) \quad (6)$$

in which A is Hurwitz. The output of the neural network $v_{ad}$ used to approximate the inversion error, $\Delta$ so that the error dynamics of Equation (6) will remain bounded, and tracking error is minimized. The constant $\zeta$ is defined by the equation:

$$\zeta = e^T Pb \quad (7)$$

in which $e^T$ is the transpose of the tracking error signal e, b is a predetermined matrix constant from Equation (6), and P is the solution of a Lyapunov equation (8).

$$A^T P + PA = -Q \quad (8)$$

in which Q is a positive definite matrix. The adaptation law for updating the neural network weights and implemented by the adaptation law unit 26 can be expressed as:

$$\dot{V} = -[\bar{x}\zeta W^T\sigma' + \lambda_V |\zeta| V]\Gamma_V \quad (9)$$

$$\dot{W} = -\Gamma_W[(\sigma - \sigma' V^T\bar{x})\zeta + \lambda_W |\zeta| W] \quad (10)$$

in which $\dot{V}$ is the derivative of the connection weight vector V of the neural network 260, $\dot{W}$ is the derivative of the W weight vector of the neural network 260, $\sigma'(z)$ is the partial derivative of sigmoidal function $\sigma(z)$ with respect to z, $\lambda_V$, $\lambda_W$, $\zeta$, $\Gamma_V$, $\Gamma_W$ are predetermined vectors, and x is the plant state signal.

For the case of a second-order reference model (FIGS. 7–10) the remaining characteristics are:

$$\ddot{x}_p = f(x_p, \dot{x}_p, d_{cmd}(d_{in})) \quad (11)$$

$$\ddot{x}_{rm} = v_{rm} - v_h = f_{rm}(x_{rm}, \dot{x}_{rm}, x_r) - v_h \quad (12)$$

$$v_{lc} = K_P(x_{rm} - x_p) + K_D(\dot{x}_{rm} - \dot{x}_p) \quad (13)$$

$$v_{pc} = v_{rm} + v_{lc} - v_{ad} \quad (14)$$

$$v_h = v_{pc} - f(x_p, \dot{x}_p, d_{cmd}(d_{in})) \tag{15}$$

$$d_{in} = f^{-1}(x_p, \dot{x}_p, v_{pc}) \tag{16}$$

in which $K_p$ and $K_d$ are predetermined constants. Equation (16) corresponds to the dynamic inversion unit 148 of FIG. 7. The tracking error signal e can be expressed as the vector of differences:

$$e = \begin{bmatrix} x_m - x_p \\ \dot{x}_m - \dot{x}_p \end{bmatrix} \tag{17}$$

It can be shown that whether $\delta = d_{in} = d_{cmd}$ or $\delta = d_{in}, \neq d_{cmd}$, the following equation holds:

$$\dot{e} = Ae + b[\Delta(x_p, \dot{x}_p, d_{cmd}) + v_{ad}] \tag{18}$$

Hence, due to the hedge signal $v_h$ generated by the hedge unit 20, the adaptive control system 10 is bounded with respect to tracking error and neural network weights. The plant will track the desired response as close as is possible within the limits of $d_{cmd}$. Without the hedge unit 20, it can be shown that the system 10 would not be stable for cases in which $d_{in} \neq d_{cmd}$.

Figure 11:
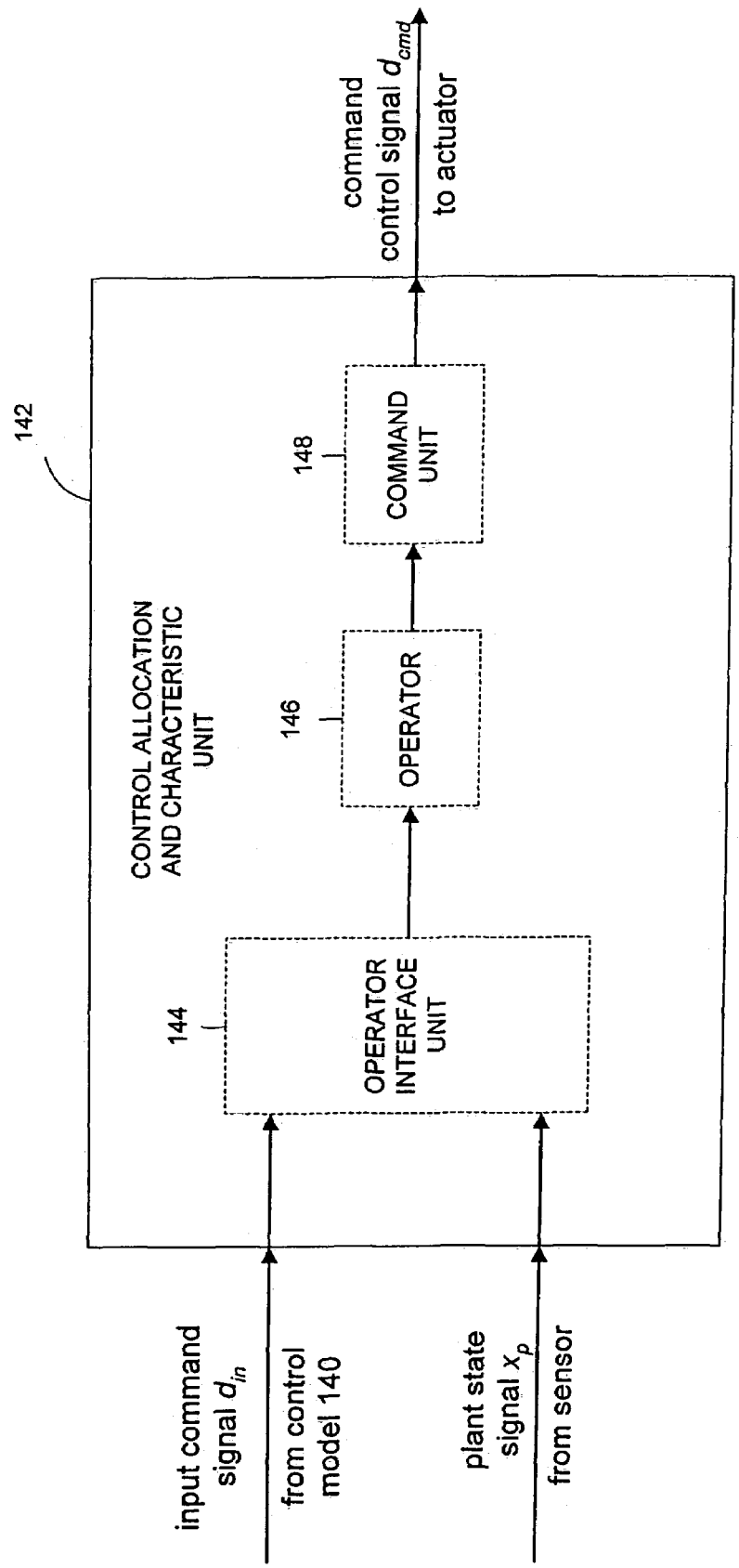
FIG. 11 is a block diagram of a control and allocation and characteristic unit in a special case in which an operator is included in the unit.

In FIG. 11 a special case of the control allocation and characteristic unit 142 is shown. More specifically, the unit 142 includes an operator interface unit 144, and operator 146, and a command unit 148. The operator interface unit 144 receives the input command signal $d_{in}$ and the plant state signal $x_p$ and generates a signal or display based on these signals. The operator 146 can be a human operator, a computer, or other machine, for example. In the case of a human operator, the operator interface unit generates a display based on the input command signal $d_{in}$ and the plant state signal $x_p$. The operator 146 uses the display from the operator interface unit 144 to control the command unit 148 to generate the command control signal $d_{cmd}$. The command control signal $d_{cmd}$ is supplied to the actuator 16 to control the state of the plant. The configuration of the unit 142 in FIG. 11 is useful in numerous contexts. For example, in an aircraft, it may be desirable to have an auto-pilot whose control of the aircraft is limited. In situations in which it is not desirable for the auto-pilot to control the aircraft, such as take-off or landing in which emergency maneuvers are more likely to be required, the aircraft's flight control system can be implemented to switch the operator 146 into the control loop with units 144 and 148 as shown in FIG. 11. In this configuration, control and response characteristic(s) generated by the operator are hedged by the hedge unit 20. One barrier to implementation of adaptive control systems in contexts such as aircraft is the stringent testing and certification required of adaptive control systems. Certification is made difficult by the fact that it may be exceedingly difficult or impossible to subject the adaptive control system to all plant states it is likely to encounter. The configuration of FIG. 11 provides the advantage of permitting the use of an adaptive control system in which the pilot operator can control the aircraft without causing the control system to adapt to the pilot's control and response. Accordingly, the configuration of FIG. 11 should facilitate testing and certification of an adaptive control system incorporating the features of the unit 142 in FIG. 11.

The adaptive control system 10 can be used in numerous applications. For example, the plant 12 can be a manned or unmanned vehicle. Such vehicle can be an aircraft, spacecraft, missile, or guided ordinance. In general, the adaptive control system 10 is assigned to control one degree of freedom of the plant 12. The actuator 16, the sensor 18, the operator interface unit 28, the operator 30, and the command unit 32 depend upon the nature of the plant 12 and the degree of freedom thereof to be controlled by the adaptive control system 10. For example, if the plant 12 is a guided vehicle such as an aircraft, spacecraft, missile or other guided ordinance, the actuator 16 could be a motor, a motor-driven screw, a hydraulic cylinder or other device attached to a control surface such as an aileron, rudder, or stabilizer. Alternatively, the actuator 16 could be a pump or valve that generates air jet(s) to change the flow of air over the guided vehicle's surface, or a frame actuator that changes the shape of the guided vehicle's surface. In addition, the actuator 16 could be thrust controllers to control the direction of thrust generated by a power plant of the aircraft. Such actuators can be used to control the degree of freedom (e.g., pitch, roll, or yaw) that is controlled by the adaptive control system 10. In the guided vehicle context, the sensor 18 can be a gyroscope or other device to measure the degree of freedom controlled by the actuator 16. In the case of a manned vehicle, the operator 30 can be a human, the operator interface unit 28 a display, and the command unit 32 a control stick and/or flight control system, for example. If the plant 12 is an automobile, the actuator 16 can be a valve for a fuel injection port, a hydraulic cylinder to move a braking element into contact with a brake drum, a transmission or other element. In this case, the sensor 18 can be a speedometer, a pressure sensor in an engine cylinder, an inertial sensor, or other elements. The plant 12 could also be a satellite, and the actuator 16 could be a thruster to orient and position the satellite in orbit. The satellite's actuator 16 could be a motor-driven electro-mechanical device to position a solar panel or transceiver unit in a desired direction. In the satellite context, the sensor 18 could be a gyroscope, for example. As another example, the operator 30 can be a combination of an auto-pilot and a human operator to take control of the plant in circumstances in which the auto-pilot is not to control the plant. Such implementation can be used in aircraft, for example. The command unit 32 can be programmed to switch control between a machine and human operator to control the aircraft plant 12. The hedge unit 20 can generate the hedge signal to hedge characteristics of the human control of the command unit 32 for stable control of the aircraft plant. It should be understood that the use of a vehicle context in the foregoing description is exemplary only, and is not intended to limit the scope or context in which the invented adaptive control system 10 can be used. Those of ordinary skill in the art should understand that the system 10 can be used in numerous other contexts and environments, such as manufacturing plants, power generation stations, and numerous other types of plants.

Any trademarks listed herein are the property of their respective owners, and reference herein to such trademarks is intended only to indicate the source of a particular product or service.

The many features and advantages of the present invention are apparent from the detailed specification and it is intended by the appended claims to cover all such features and advantages of the described methods and apparatus which follow in the true scope and spirit of the invention. Further, since numerous modifications and changes will readily occur to those of ordinary skill in the art, it is not desired to limit the invention to the exact implementation and operation illustrated and described. Accordingly, all suitable modifications and equivalents may be resorted to as falling within the scope and spirit of the invention.

The invention claimed is:

1. A method comprising the step of:
   a) generating a hedge signal with an adaptive control system to avoid adaptation to at least one characteristic of the adaptive control system, the characteristic having an effect to which adaptation would be detrimental to control of a plant with the adaptive control system.

2. A method as claimed in claim 1 further comprising the steps of:
   b) modifying a commanded state signal with the hedge signal; and
   c) generating a reference model state signal based on the commanded state signal modified with the hedge signal in the step (b).

3. A method as claimed in claim 2 further comprising the step of:
   d) generating a tracking error signal based on the reference model state signal and a plant state signal; and
   e) generating an adaptive control signal based on the tracking error signal to adapt control response of the adaptive control system.

4. A method as claimed in claim 1 wherein the plant is an aircraft and/or spacecraft.

5. A method as claimed in claim 1 wherein the plant is an automobile.

6. A method as claimed in claim 1 wherein the plant is an unmanned vehicle.

7. A method as claimed in claim 1 wherein the characteristic pertains to a control limit of the actuator used to control the plant.

8. A method as claimed in claim 7 wherein the control limit pertains to actuator end points.

9. A method as claimed in claim 7 wherein the control limit pertains to actuator dynamics.

10. A method as claimed in claim 7 wherein the control limit pertains to a rate limit of the actuator.

11. A method as claimed in claim 7 wherein the control limit pertains to quantization effects associated with the actuator.

12. A method as claimed in claim 1 wherein the characteristic relates to a control limit of the sensor.

13. A method as claimed in claim 1 wherein the control limit relates to a speed at which the sensor can sense a state of the plant.

14. In an adaptive control system for controlling a plant, a hedge unit coupled to receive at least one control signal and a plant state signal, the hedge unit generating a hedge signal based on the control signal, the plant state signal, and a hedge model including a first model having a characteristic of the adaptive control system to which the adaptive control system is not to adapt, and a second model not having the characteristic to which the adaptive control system is not to adapt, the hedge signal used in the adaptive control system to remove an effect of the characteristic from a signal supplied to an adaptation law unit of the adaptive control system so that the adaptive control system does not adapt to the characteristic in controlling the plant, the characteristic having an effect to which adaptation would be detrimental to control of a plant with the adaptive control system.

15. An adaptive control system as claimed in claim 14 wherein the characteristic pertains to a control limit of the actuator used to control the plant.

16. An adaptive control system as claimed in claim 14 wherein the control limit pertains to actuator end points.

17. An adaptive control system as claimed in claim 14 wherein the control limit pertains to actuator dynamics.

18. An adaptive control system as claimed in claim 14 wherein the control limit pertains to a rate limit of the actuator.

19. An adaptive control system as claimed in claim 14 wherein the control limit pertains to quantization effects associated with the actuator.

20. An adaptive control system as claimed in claim 14 wherein the plant is an aircraft and/or spacecraft.

21. An adaptive control system as claimed in claim 14 wherein the plant is an automobile.

22. An adaptive control system as claimed in claim 14 wherein the plant is an unmanned vehicle positioned remotely from an operator.

23. A system as claimed in claim 14 wherein the characteristic relates to a control limit of the sensor.

24. A system as claimed in claim 23 wherein the control limit relates to a speed at which the sensor can sense a state of the plant.

* * * * *